United States Patent [19]

Song

[11] Patent Number: 5,428,081
[45] Date of Patent: Jun. 27, 1995

[54] NON-ASBESTOS, FRICTIONAL MATERIAL COMPOSITION AND METHOD OF MAKING SAME

[75] Inventor: Byung Hum Song, 1058-3 Hwagok-dong, Kangsu-gu, Seoul, Rep. of Korea

[73] Assignees: Elim Engineering Corp.; Byung Hum Song, both of Rep. of Korea

[21] Appl. No.: 70,856

[22] Filed: Jun. 3, 1993

[30] Foreign Application Priority Data

Oct. 19, 1992 [JP] Japan ................................. 4-280298

[51] Int. Cl.⁶ .............................................. C08J 5/14
[52] U.S. Cl. ........................................ 523/155; 523/149; 523/153; 523/220; 524/495; 524/496; 188/251 A; 106/36
[58] Field of Search ................ 523/149, 153, 155, 220; 188/251 A; 106/36; 428/292, 297, 303, 323, 327, 329, 338, 339, 379, 408, 704; 524/495, 496

[56] References Cited

U.S. PATENT DOCUMENTS

| | | | |
|---|---|---|---|
| 4,051,097 | 9/1977 | Aldrich | 523/155 |
| 4,093,578 | 6/1978 | Vasiliev et al. | 523/149 |
| 4,384,053 | 5/1983 | Peilloud et al. | 523/153 |
| 4,420,067 | 12/1983 | Yamamoto et al. | 188/251 A |
| 4,672,082 | 6/1987 | Nakagawa et al. | 523/153 |
| 4,743,635 | 5/1988 | Nakagawa et al. | 523/155 |
| 4,876,077 | 10/1989 | Murakami | 423/448 |
| 4,954,536 | 9/1990 | Komori et al. | 523/149 |

*Primary Examiner*—Patrick J. Ryan
*Assistant Examiner*—Marie R. Macholl
*Attorney, Agent, or Firm*—Burns, Doane, Swecker & Mathis

[57] ABSTRACT

The non-asbestos, frictional material composition comprising a fibrous metal, carbon powder manufactured by sintering a mixture of coke and pitch, a hardening agent, a heat-resistant agent, and a filler for stabilizing the composition. The process for manufacturing the composition comprising manufacturing the fibrous metal and carbon powder, inserting the composition in a predetermined mold and molding the composition, and hardening the molded composition for a time.

2 Claims, 2 Drawing Sheets

NON-ASBESTOS, FRICTIONAL MATERIAL COMPOSITION AND METHOD OF MAKING SAME

BACKGROUND OF THE INVENTION

This invention relates to a non-asbestos, frictional material composition and more particularly, to a brake lining and a brake pad which has a desirable lubricant property in a dry or humid atmosphere, and which is not affected by temperature nor wears out readily and produces little noise.

Safety in driving a transportation means, such as an automobile, railway vehicle or airplane, largely depends on the function of a brake for speed control.

The function of a brake is particularly important in case of a vehicle driving at high speed or of a truck transporting heavy equipment. The brake, under any conditions, should operate punctually.

Any brake having a frictional material attached is a device which converts the kinetic energy of a vehicle into heat, and consumes the heat. Accordingly, it is very important to choose a frictional material.

Braking ability is limited by the frictional force between tires and the road surface. When the frictional force of the brake is great, the tires are locked completely, resulting in the wear of the tires. When the frictional force of the brake is little, the brake distance of the vehicle gets long, resulting in the brake ability being lost.

Accordingly, a frictional material for a brake is required to have a desirable coefficient of friction (0.28 and above), and to be worn out scarcely.

In the aspect of stability, a coefficient of friction is preferably large. However, an exceedingly large coefficient of friction will cause a great amount of wear and vibration, thus producing noise.

A great amount of wear of a frictional material will result in the lives of the frictional material being shortened. This requires frequent replacement of the frictional material, which is uneconomical. Furthermore, the production of noise and vibration gives an uneasy feeling to a driver.

In recent vehicles the engine sound or driving sound produced when the tires contact with the ground surface, is improved greatly, resulting in noise during driving being suppressed. Accordingly, evem a slight noise or even a slight sound of a brake will give an unpleasant feeling to a driver.

To overcome the above-described disadvantages, a lubricant has been added.

Presently used lubricants are carbon (graphite), molybdenum disulfide and calcium carbonite. Of these carbon is in more general use.

There are two kinds of friction compositions, i.e, semimetal friction compositions and asbestos friction composition.

The asbestos friction composition comprises 20 to 60 parts by weight of asbestos powder of 5 or 6 grade, 35 to 65 parts by weight of inorganic filler and 30 to 40 parts by weight of phenol resin, auxiliary resin or plasticizer. Cermet powder containing 65 to 80% of carbon component and 20 to 35% ferric iron component may be substituted for some or all of the inorganic filler.

The inorganic filler refers to conventional calcium carbonite, barium sulfate, alumina, barium sulfate, talc, kaolin, mullite, calcium silicate, silicate in powder form, silica in minute powder form, metal (i.e, copper, iron, brass, aluminum or zinc) in powder form, and metal oxide.

Conventional frictional materials where the main component of the inorganic filler, cermet powder, contains 25 to 35% iron component, is readily oxidized and corroded when exposed to the atmosphere for a long period, resulting in a sudden lowering of the frictional function. Furthermore, the strength and wear resisting property of the conventional frictional material will be suddenly lowered by absorbed moisture.

The conventional frictional material is excellent in breaking ability, but generates excessive heat by excessive frictional breaking, thus being oxidized readily. Furthermore, since the conventional frictional material lacks frictional stabilization at high temperature, the brake will not be applied smoothly, thus producing noise.

In addition, since the conventional frictional composition contains asbestos, asbestos dust will be produced during manufacture or when in use. This makes the circumference of tires dirty and causes environmental disruption. Furthermore, the absorption of the asbestos dust will cause various diseases which are hard to cure, i.e, cancer.

In the conventional frictional material, since the inorganic filler contains 65 to 80% of carbon, the amount of wear will be increased and a noise will be produced in dry weather during winter. On the contrary, in humid weather during summer, tires will skid.

The reason why a lubricant of graphite in conventional frictional material is readily affected by humidity is that moisture in the air is adsorbed in or between the crystals of the graphite.

SUMMARY OF THE INVENTION

An object of the present invention is to provide a non-asbestos frictional material composition such as non-asbestos brake lining or brake pad, and manufacturing method thereof, the non-asbestos frictional material not being subject to corrosion or oxidation even when exposed to the atmosphere for a long time, thus not affecting the braking function, the non-asbestos frictional material facilitating a smooth breaking and being scarcely changed in the strength and the wear-proof properties thereof.

Another object of the present invention is to provide a non-asbestos frictional composition such as non-asbestos brake lining or brake pad, and manufacturing method thereof, the non-asbestos, frictional composition producing little frictional noise and having suitable lubricative property regardless of dry or wet atmosphere for smooth braking function.

Still another object of the present invention is to provide a non-asbestos, frictional material composition such as non-asbestos brake lining or brake pad, and manufacturing method thereof, the non-asbestos, friction material composition producing no non-asbestos dust, thus not causing environmental pollution and industrial disaster, the non-asbestos, frictional material composition having a long life.

The non-asbestos, frictional material composition according to the present invention comprises a fibrous metal manufactured by cutting short and thin fiber from an ingot of a material containing zinc (Zn), manganese (Mn), carbon (C), chrome (Cr), nickel (Ni), copper (Cu), sulfur (S) and aluminum (Al); carbon powder manufactured by sintering a mixture of coke and pitch at a low temperature and then at a high temperature to have a constant of crystal lattice not being affected by the change of humidity; a hardening agent of a resinous material to give water-proof property to the constituents of the non-asbestos, frictional material composition by a bonding force produced when the hardening agent is hardened by heat; a heat resistant agent of an inorganic material substantially not being dissolved in water, having heat resistant and refractory properties and having a high degree of hardness; and a filler for stabilizing the constituents of the non-asbestos, frictional material composition when the constituents contact heat and air.

It is preferable that the non-asbestos, frictional material composition contains copper powder to have strong adhesive force.

The composition is preferably to comprise 25 to 40 parts by weight of the fibrous metal, 15 to 25 parts by weight of the carbon powder, 15 to 25 parts by weight of the resinous hardening agent, 5 to 10 parts by weight of the inorganic heat resistant agent and 5 to 15 parts by weight of the stabilizing filler. The non-asbestos, frictional material composition should have 100 parts by weight in total.

The carbon powder contains 50 parts by weight of coke and 50 parts by weight of pitch and its constant of crystal lattice is in the range of 6.75 to 6.85. The resinous hardening agent contains phenol resin.

The inorganic heat resistant agent is composed of oxidized aluminum. The stabilizing filler is composed of barium sulfate.

It is preferable that the non-asbestos frictional material composition comprises 30 parts by weight of the fibrous metal having a diameter of 0.01 to 0.05 mm and a length of 2 to 3 mm, 20 parts by weight of the carbon powder of 50 mesh and below, 20 parts by weight of the phenol resin, 15 parts by weight of the copper of 45 mesh and below, 10 parts by weight of the barium sulfate and 5 parts by weight of the oxidized aluminum.

The process of manufacturing the non-asbestos, frictional composition comprises manufacturing a fibrous metal by cutting short and thin fibers from an ingot comprising zinc, manganese, carbon, chrome, nickel, copper, sulphur and aluminum; manufacturing carbon powder by sintering a mixture of coke and pitch at a low temperature and then at a high temperature to obtain a constant of crystal lattice which is not being affected by the change of humidity; inserting in a predetermined mold and molding a composition for a time period, at a temperature and under a pressure that will not change the properties of the composition, the composition comprising a fibrous metal obtained from the fibrous metal manufacturing process, carbon powder obtained from the carbon powder manufacturing process, a hardening agent of resinous material giving water-proof property to the constituents of the composition by a coupling force produced when the hardening agent is hardened by heat, inorganic heat resistant agent of great hardness degree which is substantially not dissolved in water and has heat resistant and refractory properties, a filler which stabilizes the constituents of the composition when they contact with air and heat; and hardening the pressure molded composition for a time period and at a temperature which will not change the resinous hardening agent of the composition.

In the fibrous metal manufacturing process, the ingot of the fibrous metal is rotated at a high speed and cut to have a diameter of 0.01 to 0.05 mm and then cut by the bite to have a length of 2 to 3 mm.

In carbon powder manufacturing process, 50 parts by weight of coke is mixed with 50 parts by weight of pitch. The mixture is heated approximately at a temperature of from 500° to 600° C. for 10 to 20 minutes and then heated approximately at a temperature of from 200° to 2500° C. for 10 to 20 minutes to obtain 6.75 to 6.85 of a constant of crystal lattice thereof.

It is preferable that the heat resistant agent of inorganic material is composed of oxidized aluminum and the stabilizing filler is composed of barium oxide.

In the pressure molding process, the composition is heated at a temperature of from 160° to 185° C. under pressure of 30 to 50 Kg/cm2.

In the hardening process, the composition is heated at a temperature of from 160° to 185° C. for 7 to 9 hours and hardened by after cure.

In the method of the present invention, it is preferable that to be dehydrated the composition is heated for 1 to 3 hours at a temperature by which moisture of approximately 100° C. can be evaporated.

Since the composition of the present invention comprises the resinous hardening agent, inorganic heat resistant agent and stabilizing filler, it will not be oxidized even when exposed to the atmosphere for a long time.

Since the composition of the present invention comprises the carbon powder having the constant of crystal lattice as a lubricant, it has a suitable lubricating property under any humidity conditions.

Since the composition of the present invention comprises fibrous metal instead of asbestos for use as a frictional material, it creats no asbestos dust, thus preventing industrial disaster and environmental pollution.

According to the method of this invention, since the composition is produced through pressure molding and hardening process, it has an excellent strength.

According to the method of this invention, the ingot is rotated at high speed by a motor with holding apparatus and produced as fibrous metal of diameter of 0.01 to 0.05 mm by a tool grinder. Thereafter, the fibrous metal is cut in of 2 to 3 mm.

According to the method of this invention, 50 parts by weight of coke is mixed with 50 parts by weight of pitch. The mixture is sintered at low temperatures of approximately 500° to 600° C. for 10 to 20 minutes and then at high temperatures of approximately 200° to 2500° C. for 10 to 20 minute, thus producing carbon powder having 6.75 to 6.85 of a constant of crystal lattice.

According to the method of this invention, the composition is obtained under the pressure of 3 to 50 Kg/cm2 at temperatures of 160° to 185° C. Furthermore, the hardening of the composition is accelerated by after cure in which the composition is heated at temperatures from 160° to 185° C. for 7 to 9 hours.

According to the method of the present invention, the composition, immediately before being pressurized, is heated for 1 to 3 hours at such temperature that moisture of approximately 100° C. is evaporated. Accordingly, the composition is dehydrated and readily molded.

Brief Description of the Drawings

FIG. 2-A shows a condition where the humidity is in the range of 18 to 23%; and

FIG. 2-B shows a condition where the humidity is in the range of 55 to 65%.

DETAILED DESCRIPTION OF THE INVENTION

Figure 1:
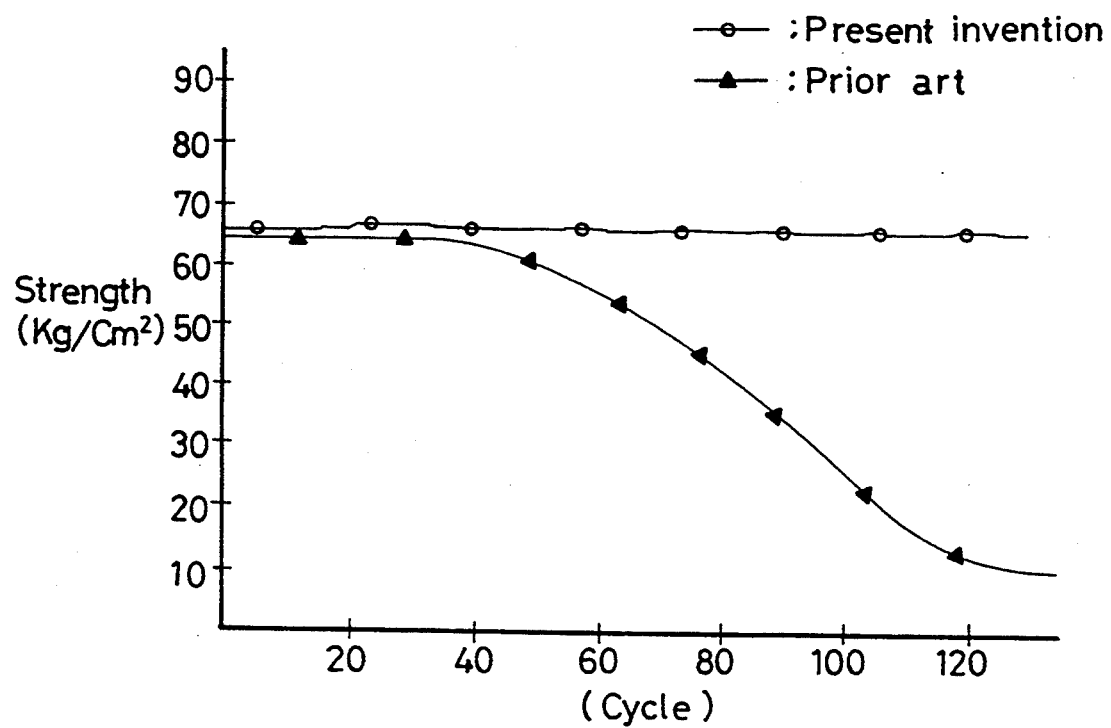
FIG. 1 is a graph showing the relation of cycle to strength in an aging test of the frictional material obtained by the method of the present invention compared to the prior art.

The fibrous metal is manufactured by mixing 60 to 65 parts by weight of zinc, 9 to 13 parts by weight of manganese, 7 to 10 parts by weight of carbon, 5 to 8 parts by weight of chrome, 3 to 6 parts by weight of nickel, 3 to 6 parts by weight of copper, 1 to 2 parts by weight of sulphur and 0.5 to 2 parts by weight of aluminum. The fibrous metal is manufactured having a diameter of 0.01 to 0.05 mm and a length of 2 to 3 mm.

In the method of manufacturing the fibrous metal, the material is mixed at a predetermined rate and melted or liquified completely to produce a cylindrical ingot. The ingot is rotated at approximately 4200 to 4500 RPM by a motor having holding device and then cut in a predetermined length and diameter. The cut fibrous metal is used as a frictional material for use in a brake.

To manufacture graphite (carbon) utilized as a lubricant, coke and pitch are mixed and firstly sintered at low temperature.

The low temperature and time for first sintering are approximately 500° to 600° C. and 10 to 20 minutes, respectively. According to tests, 15 minutes are required for best sintering condition.

The coke is a porous solid containing 70 to 80% of carbon, 10 to 20% of ash and other constituents such as volatile content. The pitch has an oil constituent obtained after distillation of tar. When the coke and pitch are mixed and distillated, the carbon powder is coked, thus preventing the peneration of moisture. Accordingly, the coke and pitch serve to prevent corrosion and decomposition.

The coke and pitch are mixed in the ratio of 40 to 60 parts. Preferably, not to lose coking property, they were mixed in the ratio of 50 to 50 parts.

After the process of low temperature sintering, the constant of crystal lattice is changed by a high temperature sintering process.

The high temperature means the range of 2000° to 2500° C. Most preferably, the high temperature sintering may be continued for 10 to 20 minutes at a temperature of from 2300° to 2500° C.

The constant of crystal lattice is in the range of 6.75 to 6.85 in which the carbon powder is rarely not affected by humidity. If heated by a temperature from 2300° to 2500° C., the constant of crystal lattice further decreases. Accordingly, to obtain a constant of crystal lattice of from 6.75 to 6.85, it is desirable to heat the composition at a temperature of 2500° C. and below.

The carbon powder used in this process should be 200 mesh and below.

According to the above processes, the resinous hardening agent, heat resistant agent of metal and stabilizing filler are added to the fibrous metal and carbon powder, thus molding brake lining or pad. After the molding process, the composition goes through hardening process, thus producing finished product.

As the resinous hardening agent, phenol resin is preferable.

The phenol resin is obtained by condensation of phenols and Aldehyde. The phenol resin is gradually hardened by heat and is thermosetting. In addition, the phenol resin has a high degree of adhesive strength, thus fastening other constituents.

As the heat resistant agent, alumina is preferable.

The alumina is insolubile in water. After heated, the alumina is insolubile in acid and has a high heat resistant and refractory properties. The alumina has a high hardness when in mixed condition with other constituents. When the alumina is mixed with other constituents, dehydration occurs, thus dehydrating the composition of this invention quickly.

The particles of the alumina are 250 mesh and below and are mixed with other constituents of the composition.

As the filler, barium sulfate is used.

The barium sulfate generally has an effect of, in air and heat, stabilizing the mixture of itself and other constituents and are preventing discoloration. In this invention, the effect of stabilizing the constituents is preferred.

The composition of this invention comprises 25 to 40 parts of the fibrous metal, 15 to 25 parts of carbon powder, 15 to 25 parts of phenol resin, 5 to 15 parts of barium sulfate and 5 to 10 parts of heat resistant agent of a metal material. The mixture of the constituents is heated by a temperature required for molding.

The total parts of the composition of the present invention is 100. The composition of this invention is resistant to heat and wear and it is stabilized with respect to the change of humidity by the change of constant of crystal lattice of the carbon powder. The composition produces no noise and its life will be lengthened by anti-corrosion property by the resinous hardening agent.

In addition, the composition has high heat-resistance and refractory property. Therefore, when a strong braking force is applied, a quick stop is made. In addition, when a sudden braking is repeated, the property of the brake lining and pad embodying the present invention, is stably maintained and the lowering of the braking strength is prevented.

The composition of this invention is inserted in a mold in the shape of brake lining or pad for vehicles or airplanes and pressed at a predetermined temperature.

The temperature and time required for the molding process should be in such a range in which the property of the hardening agent does not change, since the resinous hardening agent is sensitive to high temperature.

The pressure required for the manufacturing of the invention is 30 to 50 kg/cm. 35 Kg/cm is most preferable. The heating temperature is within 200° C. and preferably 160° to 185° C.

One hour is enough for heating pressure molding process.

The molded product goes through a post cure process for maintaining complete hardness and shape.

As described above, in the hardening process, the composition is heated to a temperature and for a time which will not change the property of the hardening agent, since the resinous hardening agent is sensitive to a high temperature.

The temperature is within 200° C. and preferably, in the range of 160 to 185. The composition is heated for more than 5 hours, not exceeding 10 hours. 7 to 9 hours are preferable.

Through those processes, a finished brake lining and pad are obtained.

The composition may comprise copper powder to stick a brake drum or disk fast to a lining and pad.

The copper powder may have 10 to 20 parts by weight and preferably, about 15 parts by weight.

Immediately before going through the pressure molding process, the composition may go through a dehydration process for preventing the lowering of the efficiency of the composition by natural corrosion when in use or in circulation.

The dehydration process is achieved at a temperature of about 100 or in the range of 85° C. to 100° C.

The heating time is about one to three hours, taking into account the fact that the constituents having the lowest melting point are not changed with regard to their properties.

The composition of the present invention is obtained by mixing 30 parts of fibrous metal, 20 parts of carbon powder of 180 mesh and below, 20 parts of phenol resin, 15 parts of copper powder of 45 mesh and below, 10 parts of barium sulfate and 5 parts of alumina. The mixture is then dried for 3 hours at a temperature of from 85° to 95° C. The dried mixture is molded under pressure of 35 Kg/cm at a temperature of 170° C. into a predetermined shape and configuration. The molded composition is hardened at a temperature of 180° C. for 8 hours, thus being produced as a finished disk brake lining and disk brake pad. Data is as follows.

Thereafter, 30 parts by weight of short fibrous metal, 20 parts by weight of carbon powder of 180 mesh, 20 parts by weight of phenol resin, 15 parts by weight of copper of 45 mesh, 10 parts by weight of barium sulfate, and 5 parts by weight of alumina powder of 250 mesh were mixed and dried for thirty minutes at 90° C. The mixture was pressed under 35 Kg/cm at 170° C. to produced a disk brake lining or disk brake pad.

The above-described composition rate is not absolute but just an exemplification to obtain the following value obtained by a test.

Aging test of the frictional material (exemplification of the test result)

This test was conducted by using commercially available apparatus.

To obtain water-proofing property, a lining and brake pad are put in boiling water.

One cycle of the process of the present invention comprises boiling a lining and brake pad in water at 100° C. for three hours and drying them for five hours at 80° C. and leaving the dried brake and lining in a room. This cycle was repeated 100 times. The grade of strength and rust per 20 cycles is shown in FIG. 1.

The strength of the conventional frictional material is maintained until 40 cycles. The strength was suddenly decreased in the process at 60, 80 and 100 cycles. A large amount of rust was created on the front end face.

However, the strength of the frictional material of the present invention was not lowered until 100 cycles.

TABLE I

Table of Composition of the Fibrous metal (weight by %)

| | Mixture Example No(s). | | | | | | | | | |
|---|---|---|---|---|---|---|---|---|---|---|
| | 1 | 2 | 3 | 4 | 5 | 6 | 7 | 8 | 9 | 10 |
| Zn | 60 | 61 | 62 | 63 | 64 | 65 | 64 | 63 | 62 | 61 |
| Cr | 8 | 6.5 | 7 | 6 | 5.5 | 5 | 8 | 7 | 8 | 7 |
| Mn | 10 | 11.5 | 10 | 12 | 12 | 13 | 9 | 11 | 9 | 11 |
| Ni | 5.5 | 4.5 | 5 | 4 | 3.5 | 4 | 4 | 3 | 4 | 5 |
| Cu | 5.5 | 4.5 | 5 | 4 | 3.5 | 4.5 | 4 | 3 | 4 | 5 |
| C | 8 | 10 | 7 | 9 | 8.5 | 7 | 9 | 10 | 9 | 8 |
| S | 1.5 | 1.5 | 2 | 1 | 1.2 | 1 | 1.5 | 1.5 | 2 | 1 |
| Al | 1.5 | 0.5 | 2 | 1 | 1.8 | 0.5 | 0.5 | 1.5 | 2 | 1 |
| Total | 100 | 100 | 100 | 100 | 100 | 100 | 100 | 100 | 100 | 100 |

A mixture having the composition as shown in the above table was melted or liquified completely and produced as an ingot. The ingot was rotated at about 4300 RPM with a motor an with a tool grinder, produced as a fibrous metal having diameter of 0.3 mm and a length of 2 mm.

Thereafter, 50 parts by weight of coke is mixed with 5 parts by weight of pitch. The mixture was first sintered at a low temperature for 15 minutes and then at a high temperature for 15 minutes. As a result, carbon powder having a predetermined constant of crystal lattice was produced.

The following table 2 shows the relationship of the constant of the crystal lattice of carbon powder obtained by the first sintering temperature to that obtained by the second sintering temperature.

TABLE 2

| first sintering temperature (°C.) | second sintering temperature (°C.) | constant of the cry tal lattice |
|---|---|---|
| 500 | 2000 | 6.85 |
| 550 | 2300 | 6.80 |
| 600 | 2500 | 6.85 |

The reason is that the resinous hardening agent blocks moisture when it is mixed with other constituents. In actual use, even though moisture is present between the drum or brake disk and the lining, the braking force of them is not lowered and the shape of them is not changed.

Upon reviewing the value in FIG. 1, the frictional material of the present invention does not produce rust and is not lowered in its strength under any conditions such as heat and moisture.

Test for frictional resistance rate

This test was also conducted by using available test apparatus.

The finished lining and brake were tested with an inertial frictional test apparatus. The measuring speed was 50 Km/h and frictional pressure was 10 Kg/cm. One minute was spent for a time. The humidity was 18 to 23% and 55 to 65%.

Figure 2A:
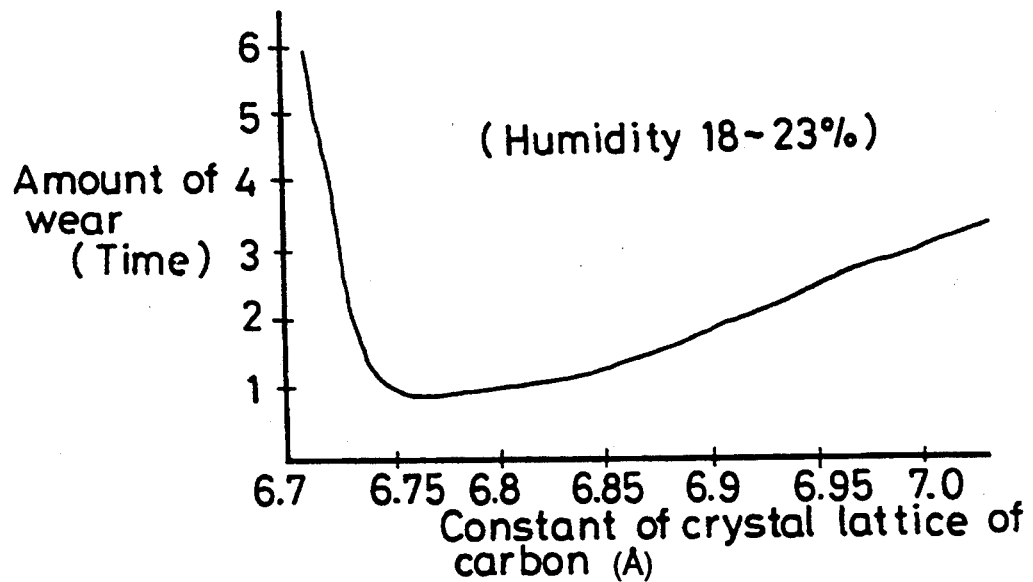
FIGS. 2A and 2B are two graphs showing the relation of the constant of crystal lattice to the wear amount of carbon powder in the wear resistant test of the frictional material.
Figure 2B:
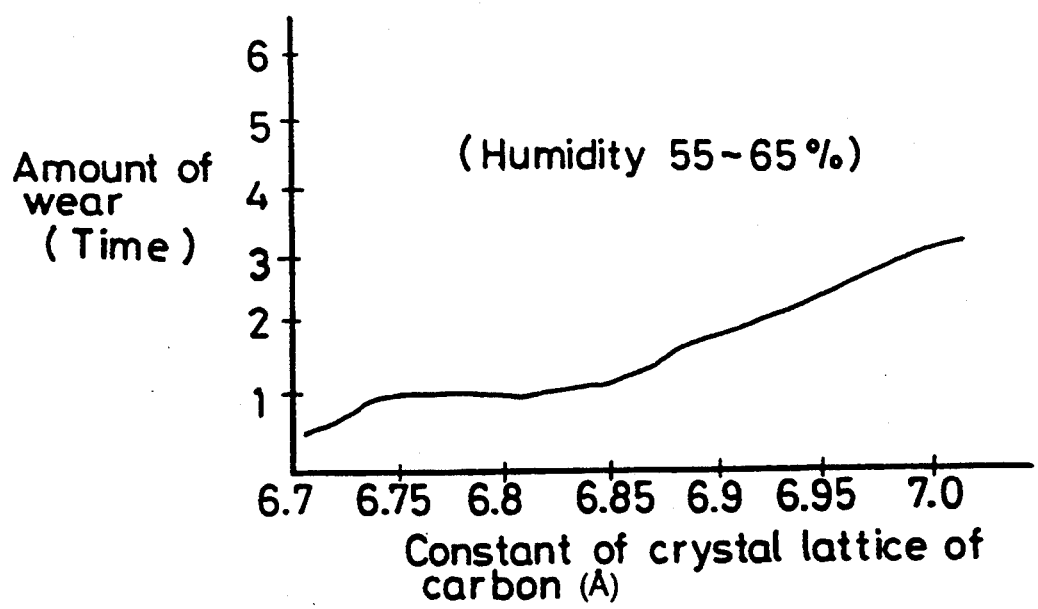

The results are shown in FIGS. 2A and 2B.

The amount of wear of the frictional material to which carbon powder having 6.75 to 6.85 of constant of crystal lattice was extremely low regardless of humidity.

The test shows that the performance of the brake was not affected by any weather change and a predetermined braking force was maintained.

As shown in the above description, in this invention, by changing the constant of the crystal lattice of the carbon contained in the disk brake lining or disk brake pad, and coating the composition with resinous hardening agent, the frictional material of the present invention is not affected by the temperature and has a suitable lubricant property and coefficient of friction, thus facilitating the braking by frictional force. Furthermore, the frictional coefficient is scarcely changed by oxidation and heating, and has a strength and anti-wear property which is scarcely changed by the humidity, whereby the braking force of the frictional material of the present invention is stabilized. In addition, noise is scarcely produced, which enables a driver to drive pleasantly.

The amount of the dust discharged to the around of the tires during driving is decreased suddenly, thus preventing the appearance of the vehicle being damaged.

In particular, as the frictional material of the present invention contains no asbestos, an attack by the disease which is fatal to a person is prevented and environmental pollution is prevented.

In addition, life of the frictional material is lengthened, whereby a user will be given an economic gains. Furthermore, any transportation facilities requiring braking function such as vehicles or airplanes are operated safely and servicably.

What is claimed is:

1. Non-asbestos, frictional material composition comprising:
    a fibrous metal,
    carbon powder,
    a hardening agent,
    a heat resistant agent, and
    a filler,
    wherein the fibrous metal comprises zinc, manganese, carbon, chrome, nickel, copper, sulfur and aluminum;
    the carbon powder having a constant of crystal lattice of 6.75 to 6.85 Angstroms which constant is substantially unaffected by changes in humidity;
    the hardening agent comprising a phenol resin to give water-proofing property to the non-asbestos, frictional material composition;
    the heat resistant agent comprising a, refractory, substantially water-insoluble, inorganic solid; and
    the filler comprising barium sulfate to stabilize the non-asbestos, frictional material composition when the non-asbestos, frictional material composition contacts heat and air.

2. Non-asbestos, frictional material composition according to claim 1, wherein the heat resistant agent comprises aluminum oxide.

* * * * *